US006802062B1

(12) United States Patent
Oyamada et al.

(10) Patent No.: US 6,802,062 B1
(45) Date of Patent: Oct. 5, 2004

(54) SYSTEM WITH VIRTUAL MACHINE MOVABLE BETWEEN VIRTUAL MACHINE SYSTEMS AND CONTROL METHOD

(75) Inventors: Kenichi Oyamada, Yokohama (JP); Masaru Sato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/568,054

(22) Filed: May 10, 2000

Related U.S. Application Data

(63) Continuation of application No. 09/053,055, filed on Apr. 1, 1998, now abandoned.

(51) Int. Cl.[7] .......... G06F 17/00
(52) U.S. Cl. .......... 718/1; 719/319
(58) Field of Search .......... 709/329, 339; 718/1; 719/319

(56) References Cited

U.S. PATENT DOCUMENTS

| | | | | | |
|---|---|---|---|---|---|
| 5,369,750 | A | * | 11/1994 | Inoue et al. | 709/100 |
| 5,386,536 | A | | 1/1995 | Courts et al. | 711/202 |
| 5,394,537 | A | * | 2/1995 | Courts et al. | 711/202 |
| 5,408,649 | A | * | 4/1995 | Beshears et al. | 714/10 |
| 5,553,291 | A | * | 9/1996 | Tanaka et al. | 709/1 |
| 5,574,914 | A | * | 11/1996 | Hancock et al. | 712/220 |
| 5,583,987 | A | * | 12/1996 | Kobayashi et al. | 714/13 |
| 5,621,912 | A | * | 4/1997 | Borruso et al. | 718/1 |
| 5,636,341 | A | * | 6/1997 | Matsushita et al. | 714/13 |
| 5,640,584 | A | * | 6/1997 | Kandasamy et al. | 712/30 |
| 5,819,020 | A | * | 10/1998 | Beeler, Jr. | 714/5 |
| 5,884,018 | A | * | 3/1999 | Jardine et al. | 714/4 |
| 5,978,912 | A | * | 11/1999 | Rakavy et al. | 713/2 |
| 6,002,851 | A | * | 12/1999 | Basavaiah et al. | 714/4 |
| 6,012,151 | A | * | 1/2000 | Mano | 714/11 |
| 6,681,238 | B1 | * | 1/2004 | Brice et al. | 718/1 |

* cited by examiner

*Primary Examiner*—John Follansbee
*Assistant Examiner*—Haresh Patel
(74) *Attorney, Agent, or Firm*—Antonelli, Terry, Stout & Kraus, LLP

(57) ABSTRACT

A virtual machine system is constructed between a plurality of real machines of a multiprocessor system. In order to move a virtual machine operating in a virtual machine system on a given real machine to a virtual machine system on another real machine, each virtual machine system is managed by attaching a common logic name to the real machine resources. The origin of the virtual machine (VM) is notified of the logic name of the real resource corresponding to the VM configuration information. The destination VM includes a device for generating an identical VM configuration according to the logic name received thereby to realize the movement of the VM configuration. Also, the origin VM holds a new asynchronous operation request for the VM to be moved, and suspends the operation of the VM. The VM resource information and the asynchronous operation hold information are transferred to the destination. The destination VM restarts the VM operation in accordance with the received information.

8 Claims, 12 Drawing Sheets

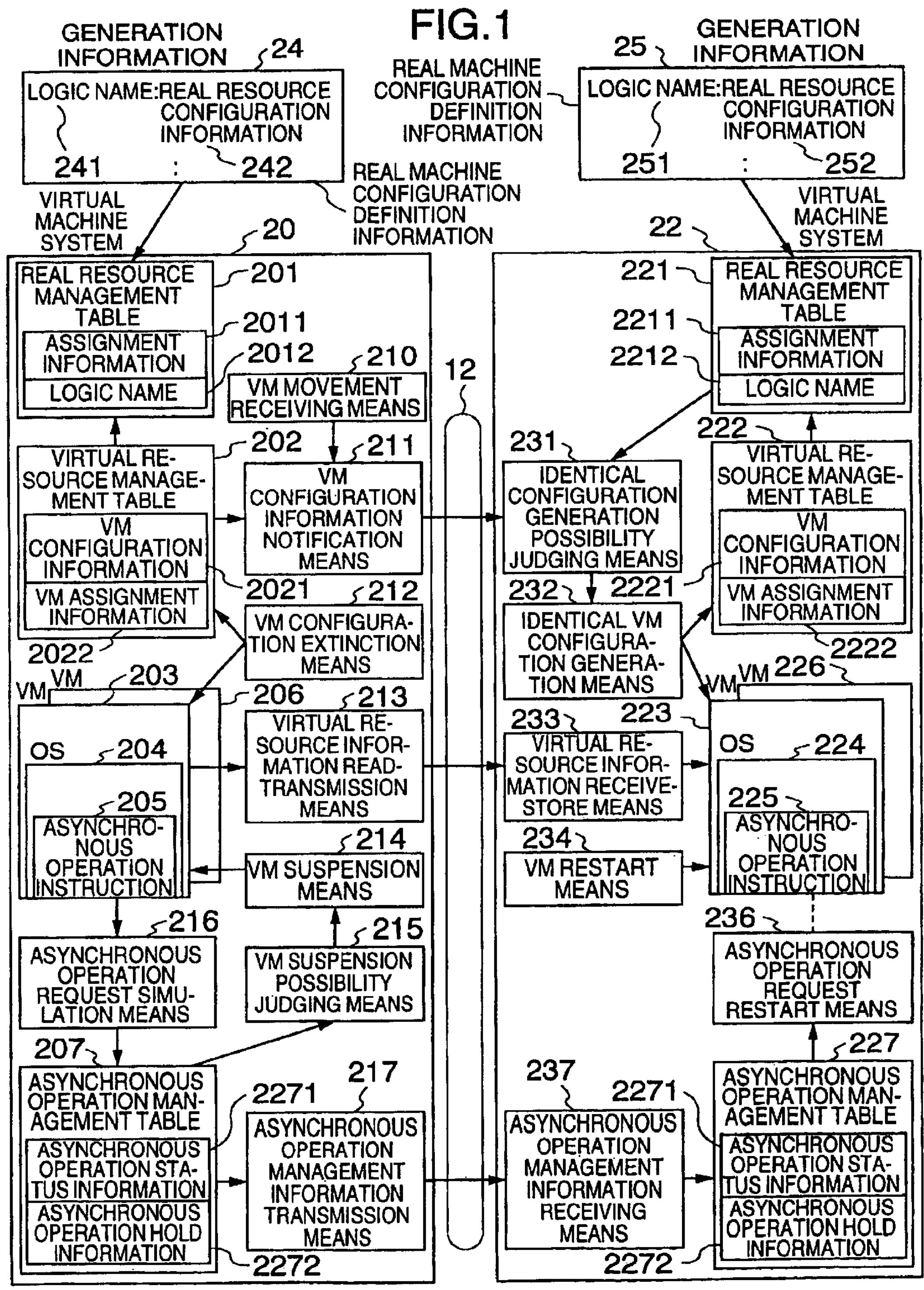
FIG.1
GENERATION INFORMATION
24
LOGIC NAME:REAL RESOURCE CONFIGURATION INFORMATION
241
242
REAL MACHINE CONFIGURATION DEFINITION INFORMATION
VIRTUAL MACHINE SYSTEM
20
REAL RESOURCE MANAGEMENT TABLE
201
ASSIGNMENT INFORMATION
2011
LOGIC NAME
2012
VM MOVEMENT RECEIVING MEANS
210
VIRTUAL RESOURCE MANAGEMENT TABLE
202
VM CONFIGURATION INFORMATION
VM ASSIGNMENT INFORMATION
2021
2022
VM CONFIGURATION INFORMATION NOTIFICATION MEANS
211
VM CONFIGURATION EXTINCTION MEANS
212
VM
203
206
OS
204
205
ASYNCHRONOUS OPERATION INSTRUCTION
VIRTUAL RESOURCE INFORMATION READ-TRANSMISSION MEANS
213
VM SUSPENSION MEANS
214
ASYNCHRONOUS OPERATION REQUEST SIMULATION MEANS
216
VM SUSPENSION POSSIBILITY JUDGING MEANS
215
207
ASYNCHRONOUS OPERATION MANAGEMENT TABLE
ASYNCHRONOUS OPERATION STATUS INFORMATION
ASYNCHRONOUS OPERATION HOLD INFORMATION
2271
2272
ASYNCHRONOUS OPERATION MANAGEMENT INFORMATION TRANSMISSION MEANS
217
12
GENERATION INFORMATION
25
REAL MACHINE CONFIGURATION DEFINITION INFORMATION
LOGIC NAME:REAL RESOURCE CONFIGURATION INFORMATION
251
252
VIRTUAL MACHINE SYSTEM
22
REAL RESOURCE MANAGEMENT TABLE
221
ASSIGNMENT INFORMATION
2211
LOGIC NAME
2212
IDENTICAL CONFIGURATION GENERATION POSSIBILITY JUDGING MEANS
231
VIRTUAL RESOURCE MANAGEMENT TABLE
222
VM CONFIGURATION INFORMATION
VM ASSIGNMENT INFORMATION
2221
2222
IDENTICAL VM CONFIGURATION GENERATION MEANS
232
VM
226
223
OS
224
225
ASYNCHRONOUS OPERATION INSTRUCTION
VIRTUAL RESOURCE INFORMATION RECEIVE-STORE MEANS
233
VM RESTART MEANS
234
236
ASYNCHRONOUS OPERATION REQUEST RESTART MEANS
227
ASYNCHRONOUS OPERATION MANAGEMENT TABLE
ASYNCHRONOUS OPERATION STATUS INFORMATION
ASYNCHRONOUS OPERATION HOLD INFORMATION
237
ASYNCHRONOUS OPERATION MANAGEMENT INFORMATION RECEIVING MEANS
2271
2272

FIG.2

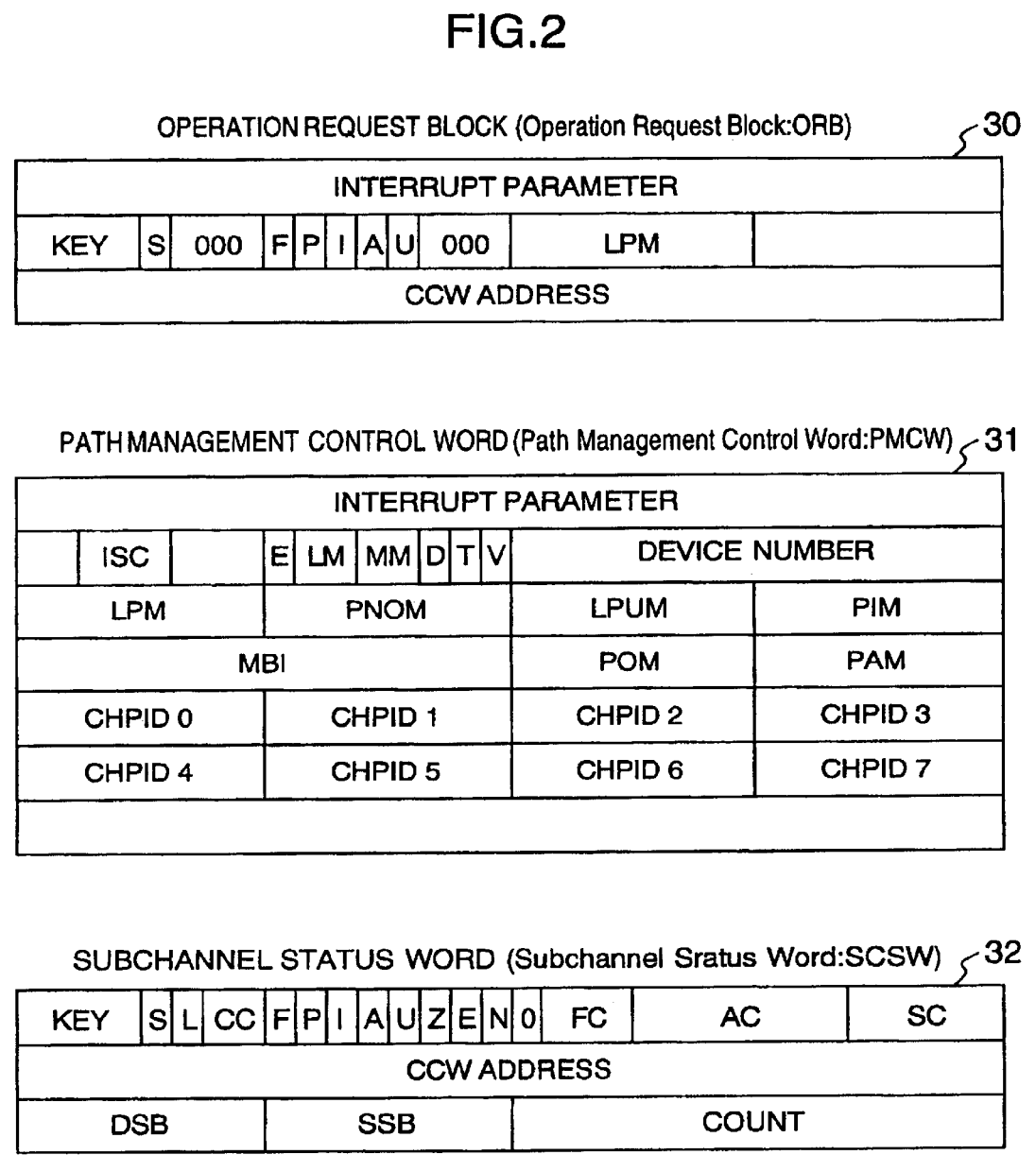

OPERATION REQUEST BLOCK (Operation Request Block:ORB) 30

| INTERRUPT PARAMETER | | | | | | | | | | |
|---|---|---|---|---|---|---|---|---|---|---|
| KEY | S | 000 | F | P | I | A | U | 000 | LPM | |
| CCW ADDRESS | | | | | | | | | | |

PATH MANAGEMENT CONTROL WORD (Path Management Control Word:PMCW) 31

| INTERRUPT PARAMETER | | | | | | | | | |
|---|---|---|---|---|---|---|---|---|---|
| | ISC | | E | LM | MM | D | T | V | DEVICE NUMBER |
| LPM | | | PNOM | | | | | | LPUM / PIM |
| MBI | | | | | | | | | POM / PAM |

| | | | |
|---|---|---|---|
| LPM | PNOM | LPUM | PIM |
| MBI | | POM | PAM |
| CHPID 0 | CHPID 1 | CHPID 2 | CHPID 3 |
| CHPID 4 | CHPID 5 | CHPID 6 | CHPID 7 |
| | | | |

SUBCHANNEL STATUS WORD (Subchannel Sratus Word:SCSW) 32

| KEY | S | L | CC | F | P | I | A | U | Z | E | N | 0 | FC | AC | SC |
|---|---|---|---|---|---|---|---|---|---|---|---|---|---|---|---|
| CCW ADDRESS | | | | | | | | | | | | | | | |
| DSB | SSB | COUNT | | | | | | | | | | | | | |

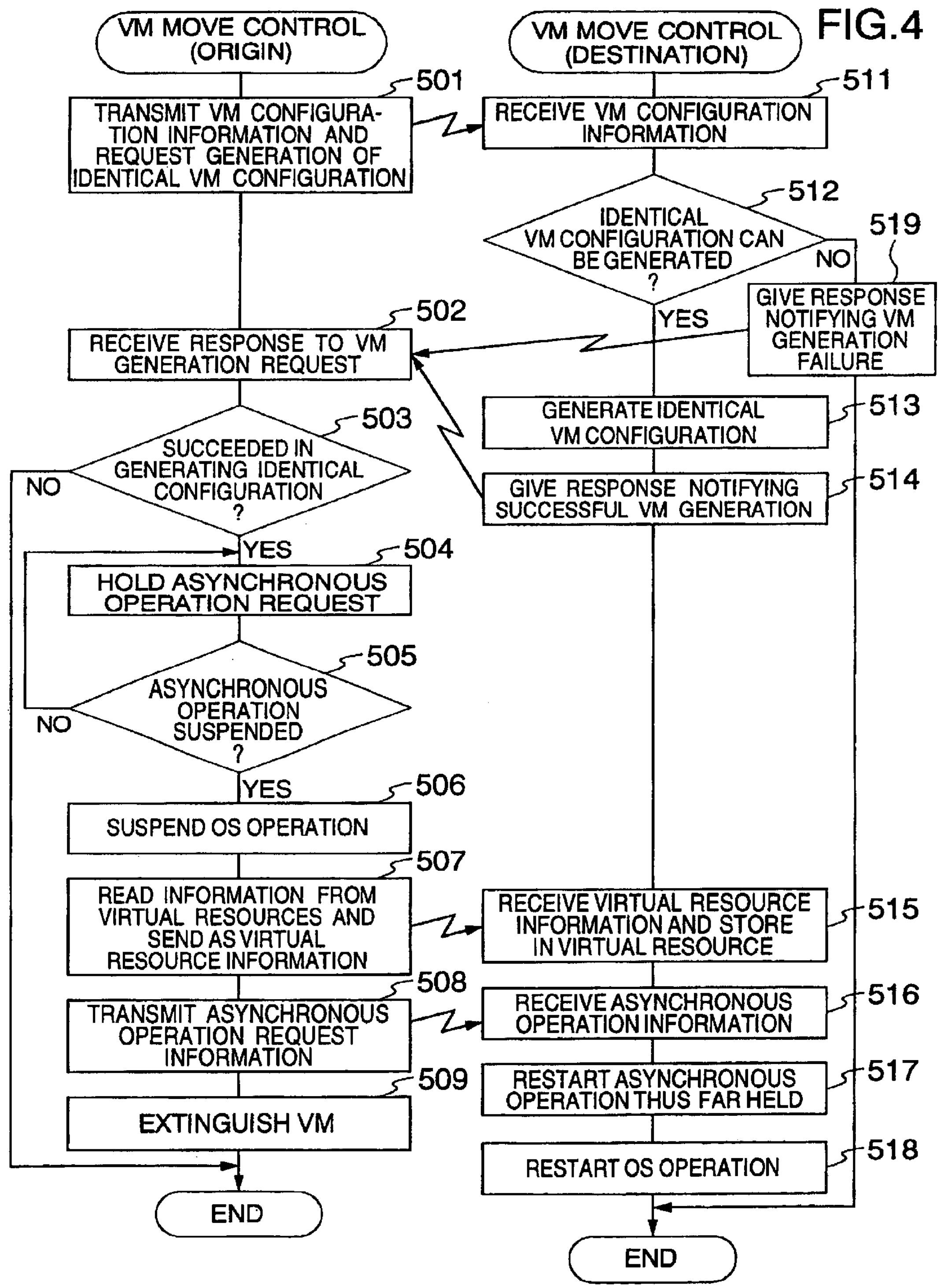
FIG.4
VM MOVE CONTROL (ORIGIN)
501
TRANSMIT VM CONFIGURATION INFORMATION AND REQUEST GENERATION OF IDENTICAL VM CONFIGURATION
502
RECEIVE RESPONSE TO VM GENERATION REQUEST
503
SUCCEEDED IN GENERATING IDENTICAL CONFIGURATION ?
NO
YES
504
HOLD ASYNCHRONOUS OPERATION REQUEST
505
ASYNCHRONOUS OPERATION SUSPENDED ?
NO
YES
506
SUSPEND OS OPERATION
507
READ INFORMATION FROM VIRTUAL RESOURCES AND SEND AS VIRTUAL RESOURCE INFORMATION
508
TRANSMIT ASYNCHRONOUS OPERATION REQUEST INFORMATION
509
EXTINGUISH VM
END
VM MOVE CONTROL (DESTINATION)
511
RECEIVE VM CONFIGURATION INFORMATION
512
IDENTICAL VM CONFIGURATION CAN BE GENERATED ?
NO
YES
519
GIVE RESPONSE NOTIFYING VM GENERATION FAILURE
513
GENERATE IDENTICAL VM CONFIGURATION
514
GIVE RESPONSE NOTIFYING SUCCESSFUL VM GENERATION
515
RECEIVE VIRTUAL RESOURCE INFORMATION AND STORE IN VIRTUAL RESOURCE
516
RECEIVE ASYNCHRONOUS OPERATION INFORMATION
517
RESTART ASYNCHRONOUS OPERATION THUS FAR HELD
518
RESTART OS OPERATION
END

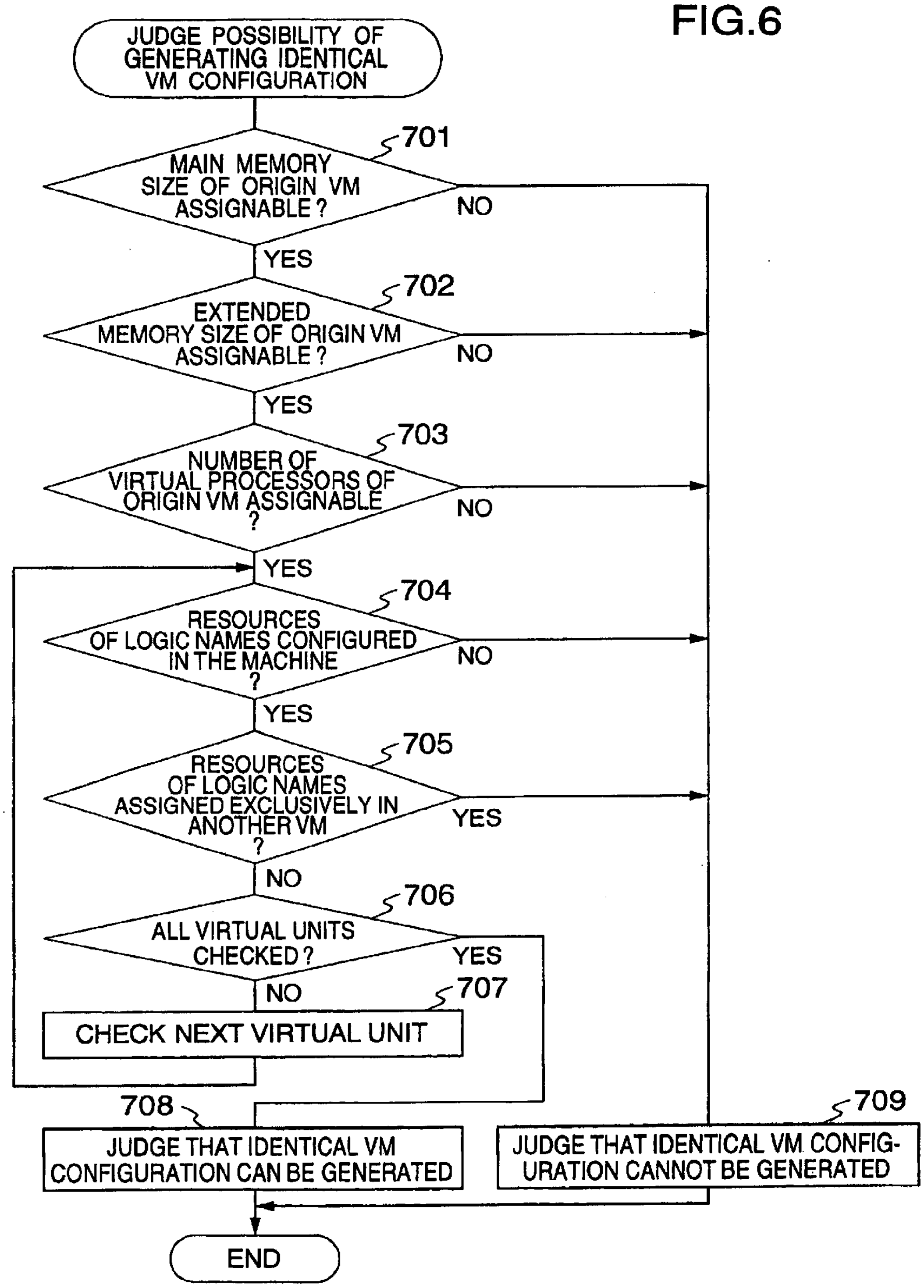
FIG.6
JUDGE POSSIBILITY OF GENERATING IDENTICAL VM CONFIGURATION
701
MAIN MEMORY SIZE OF ORIGIN VM ASSIGNABLE ?
NO
YES
702
EXTENDED MEMORY SIZE OF ORIGIN VM ASSIGNABLE ?
NO
YES
703
NUMBER OF VIRTUAL PROCESSORS OF ORIGIN VM ASSIGNABLE ?
NO
YES
704
RESOURCES OF LOGIC NAMES CONFIGURED IN THE MACHINE ?
NO
YES
705
RESOURCES OF LOGIC NAMES ASSIGNED EXCLUSIVELY IN ANOTHER VM ?
YES
NO
706
ALL VIRTUAL UNITS CHECKED ?
YES
NO
707
CHECK NEXT VIRTUAL UNIT
708
JUDGE THAT IDENTICAL VM CONFIGURATION CAN BE GENERATED
709
JUDGE THAT IDENTICAL VM CONFIG-URATION CANNOT BE GENERATED
END

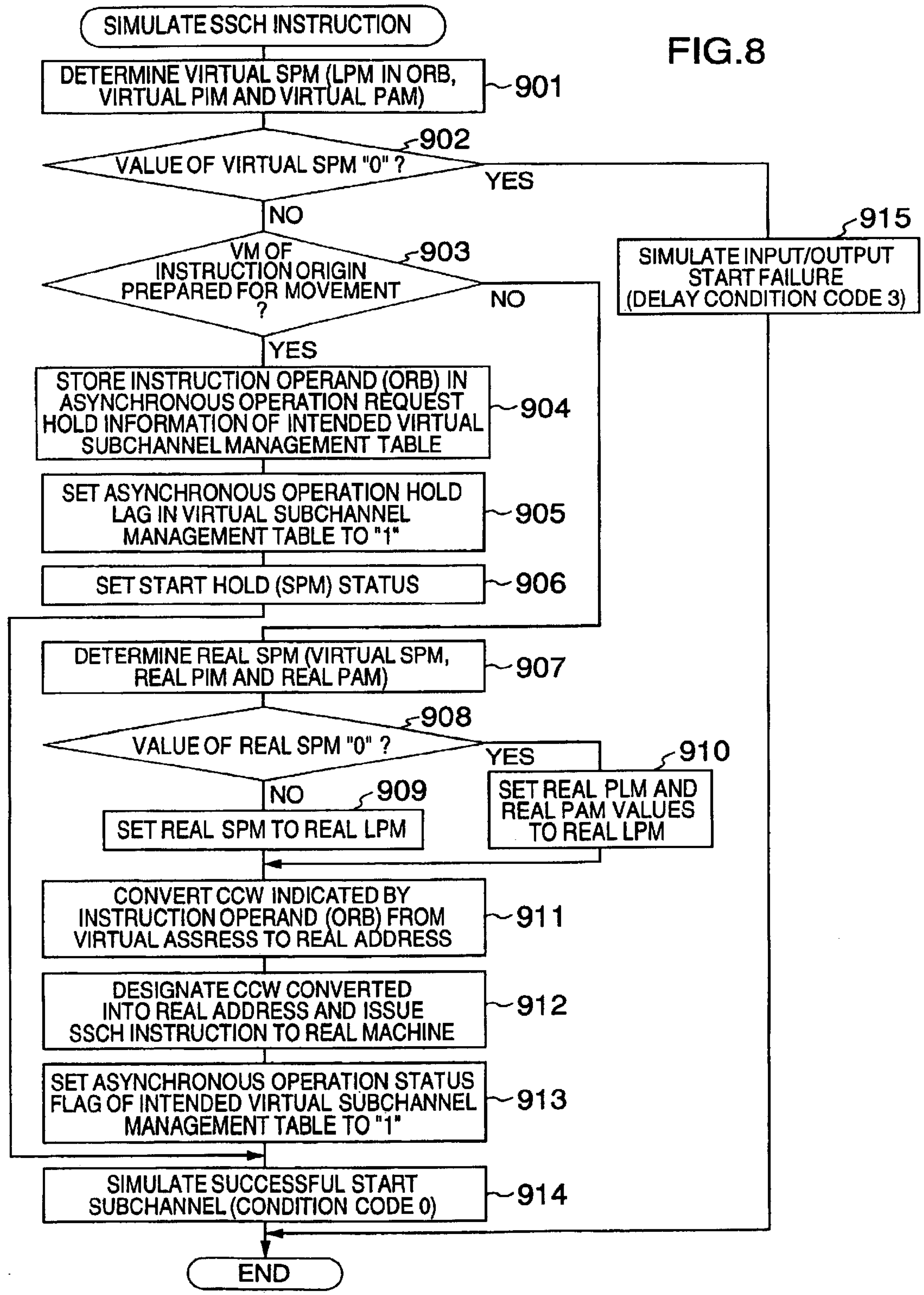
FIG.8
SIMULATE SSCH INSTRUCTION
DETERMINE VIRTUAL SPM (LPM IN ORB, VIRTUAL PIM AND VIRTUAL PAM)
901
902
VALUE OF VIRTUAL SPM "0" ?
YES
NO
903
VM OF INSTRUCTION ORIGIN PREPARED FOR MOVEMENT ?
NO
YES
915
SIMULATE INPUT/OUTPUT START FAILURE (DELAY CONDITION CODE 3)
STORE INSTRUCTION OPERAND (ORB) IN ASYNCHRONOUS OPERATION REQUEST HOLD INFORMATION OF INTENDED VIRTUAL SUBCHANNEL MANAGEMENT TABLE
904
SET ASYNCHRONOUS OPERATION HOLD LAG IN VIRTUAL SUBCHANNEL MANAGEMENT TABLE TO "1"
905
SET START HOLD (SPM) STATUS
906
DETERMINE REAL SPM (VIRTUAL SPM, REAL PIM AND REAL PAM)
907
908
VALUE OF REAL SPM "0" ?
YES
910
NO
909
SET REAL SPM TO REAL LPM
SET REAL PLM AND REAL PAM VALUES TO REAL LPM
CONVERT CCW INDICATED BY INSTRUCTION OPERAND (ORB) FROM VIRTUAL ASSRESS TO REAL ADDRESS
911
DESIGNATE CCW CONVERTED INTO REAL ADDRESS AND ISSUE SSCH INSTRUCTION TO REAL MACHINE
912
SET ASYNCHRONOUS OPERATION STATUS FLAG OF INTENDED VIRTUAL SUBCHANNEL MANAGEMENT TABLE TO "1"
913
SIMULATE SUCCESSFUL START SUBCHANNEL (CONDITION CODE 0)
914
END

SYSTEM WITH VIRTUAL MACHINE MOVABLE BETWEEN VIRTUAL MACHINE SYSTEMS AND CONTROL METHOD

CROSS-REFERENCE TO RELATED APPLICATION

This application is a continuation application of U.S. application Ser. No. 09/053,055, filed Apr. 1, 1998 now abandoned.

BACKGROUND OF THE INVENTION

The present invention relates to a virtual machine system constituting a loosely-coupled multiprocessor system including a plurality of real machines, or more in particular to a method for controlling the movement of an operating system working for a virtual machine system on a given real machine to a virtual machine system on another real machine, and a virtual machine system for realizing the transfer of the operating system working for a virtual machine system on a given real machine to a virtual machine system on another real machine.

An example of a system using a machine will be explained with reference to FIG. 12. FIG. 12 is a block diagram showing a general configuration of a virtual machine system based on a loosely-coupled multiprocessor system. The loosely-coupled multiprocessor system (LCMP) shown in FIG. 12 comprises real machine resources 13 including common resources such as a magnetic disk unit 131 and a magnetic tape unit 132 shared by a plurality of real machines (also called the bare machines), and information transmission means 12 connecting the real machines 10, 11.

In the loosely-coupled multiprocessor system (LCMP), a configuration of a machine system with a computer virtually arranged on each of the real machines 10, 11, i.e. a virtual machine system in operation will be explained with reference to FIG. 12. The virtual machine system provided for each of the real machines 10, 11, is realized by controlling the real machines 10, 11 in accordance with virtual machine control programs (VMCP) 101, 112. Specifically, the real machines 10, 11 are controlled by the VMCPs 101, 112 in such a manner that an instruction processor, a main memory, an extended memory and an input/output unit of the real machine can be used as virtual resources. The virtual machine system included in each of the real machines 10, 11, under the control of the VMCPs 101, 112, applies an input/output signal to a console 14 and a spool file 15 connected to the virtual machine system in another real machine through the information transmission means 12.

Once the virtual machines (VM) 102, 103 are generated in the virtual machine system arranged on the real machine 10, however, the particular VMs are fixed in the virtual machine system. In other words, the VMs 102, 103 are fixed in the real machine 10 and cannot be moved to another virtual machine VM 113, for example, arranged on another real machine 11. As a result, the following restrictions are imposed on the operation and management of the system.

(1) In the case where the number of the VMs in operation or the use of the main memory, the extended memory, the instruction processor (IP), the input/output channel or other machine resources by the operating system (OS) of the VM increases only for a specific real machine in the LCMP, then, the load is undesirably concentrated on the particular real machine. The result is that the operating system of the VM arranged on the particular specific real machine cannot enjoy a sufficient service. The operating system on the VM arranged on the particular specific real machine cannot use other real machine resources lower in utility rate.

(2) Also in the case where the operation of a given real machine is intentionally suspended with the aim of providing hardware maintenance of the real machine, the fact that the VM is fixed to the real machine makes it necessary to suspend the operation of the operating system on the VM arranged on the real machine to be stopped.

(3) In either case of (1) or (2) above, for the machine resources of other real machines to be used, the operation of the operating system on the VM arranged in the real machine has to be suspended, a new VM has to be generated in another real machine and the operating system on the VM arranged on the first real machine has to be reactivated.

As described with reference to FIG. 12, a VM, once generated, cannot be moved to the VM on a virtual machine system operating with another real machine as long as the operating system for the first VM is in operation. The following problems are encountered if the operation of an operating system is to be continued by moving the VM of the virtual machine system on one real machine to the VM of the virtual machine system on another real machine while the operation of the operating system for the first VM is going on.

(1) The first problem concerns the VM configuration of the origin system and destination system.

In an operating system, a hardware configuration is recognized at the time of activating the operating system, and the configuration information thereof is retrieved and managed in the main memory. Assume that the VM 103 on the real machine 10 is moved as a VM 113 on a real machine 11 in FIG. 12, for example, and that a difference exists between the origin VM 103 and the destination VM 113 in the capacity of the virtual memory or the virtual extended memory of the VM, the number of IPs or the input/output configuration. The resulting problem is that a difference develops between the hardware configuration on the VM which has thus far been managed by the origin OS 105 in the main memory and the VM hardware configuration of the destination OS 115, thereby leading to the failure to guarantee the operation of the OS 115. It is also necessary to assign the destination VM 113 with the same real machine resources as the real machine resources 13 shared and controlled in the virtual machine system by the LCMP assigned to the origin VM 103. Especially for the input/output configuration, what is called the extended channel system (ECS) is assigned a subchannel in one-to-one relation with an input/output unit regardless of the connection between the channel and the input/output unit (device). The program operating on the VM issues a start subchannel (SSCH) by designating a subchannel number corresponding to the device and an operation request block (ORB) 30 as described later and shown in FIG. 2. Specifically, it is necessary not only that the same real machine resources as the input/output unit, the magnetic disk unit 131 and the magnetic disk tape unit 132 constituting the real machine resources 13 shared in the LCMP assigned to the origin VM 103 are assigned to the destination VM 113, but also that the subchannels corresponding to the input/output units for the destination VM 113 are arranged the same way as those of the origin VM 103. Also, it is possible to read a path management control word (POMC) 31 and a subchannel status word (SCSW) 32 of each subchannel as shown in FIG. 2 from the program in response to a store subchannel (STSCH). The path management control word (PMCW) 31 has stored therein the input/output route information to the input/output unit used by a particular subchannel, including a path installed mask (PIM), a path available mask (PAM) and physical addresses CHP1D0 to CHP1DP of the channels. These input/output route information are also required to be identical between the origin VM 103 and the destination VM 113.

(2) The second problem concerns the VM stop and restart

As long as the operating system is working, the virtual resources represented by the main memory may be updated, so that information cannot be moved to another machine with the operating system working on the particular information. Specifically, for the VM to be moved, it is necessary to suspend the VM operation and restart the VM after movement. The processor resources of the VM, i.e. the virtual instruction processor can be stopped and restarted by controlling the assignment of the real instruction processor to the particular VM. The input/output operation performed asynchronously with the instruction processor is also likely to update the main memory, and must be suspended in operation. A forcible suspension of the asynchronous operation under way would make the restarting thereof difficult. This has posed the problem of how the asynchronous operation is suspended and restarted.

SUMMARY OF THE INVENTION

Accordingly, an object of the present invention is to assure an effective utilization of machine resources among a plurality of real machines by making it possible to move the operating system from one VM to another on the real machines with the virtual machine systems arranged thereon.

Another object of the invention is to improve the versatility of system operation by moving the VM between real machines.

In order to solve the above-mentioned problems, according to the present invention, each virtual machine system includes means for attaching the same logic name to the real machine resources shared among the real machines. The logic names thus attached to the machine resources are managed in the control program of each virtual machine system. The virtual machine system at the origin includes means for transferring the virtual resource information and the logic names of the corresponding real resources as VM configuration information of the VM to be moved, while the virtual machine system at the destination includes means for judging whether the same VM configuration as the origin VM configuration can be generated based on the received logic name and means for generating the same VM configuration.

Further, the virtual machine system at the origin includes means for reading and transmitting the information on the virtual resources assigned to the VM to be moved, while the virtual machined system at the destination includes means for storing the received virtual resource information in the VM thereof and restarting the VM operation.

As a result, the VM on a given machine can be moved to other machines.

Also, the virtual machine system at the origin includes means for managing the asynchronous operation status indicating an operation asynchronous with a virtual instruction processor in the VMCP and judging whether the VM can be started to move or not by recognizing the asynchronous operation status.

Further, the virtual machine system at the origin includes means for holding a new asynchronous operation request issued by the operating system and transmitting it as asynchronous operation request information when the VM thereof is moved to another real machine. The virtual machine system at the destination, on the other hand, includes means for receiving the asynchronous operation request information and reactivating the asynchronous operation request thus far held. Consequently, a given VM can be moved to and operated on another machine without suspending the asynchronous operation request in accordance with the operating system.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same, and wherein:

FIG. 1 is a general block diagram schematically showing the concept of a virtual machine system according to an embodiment of the present invention;

FIG. 2 is a control block diagram of input/output- related instructions for an extended channel system according to an embodiment of the invention;

FIG. 4 is a general flowchart showing the VM movement control according to an embodiment of the invention;

FIG. 6 is a flowchart showing the logic for judging the possibility of generating a VM of the same configuration according to an embodiment of the invention;

FIG. 8 is a flowchart showing the logic of a start subchannel simulation according to an embodiment of the invention;

DESCRIPTION OF THE PREFERRED EMBODIMENTS

Figure 3:
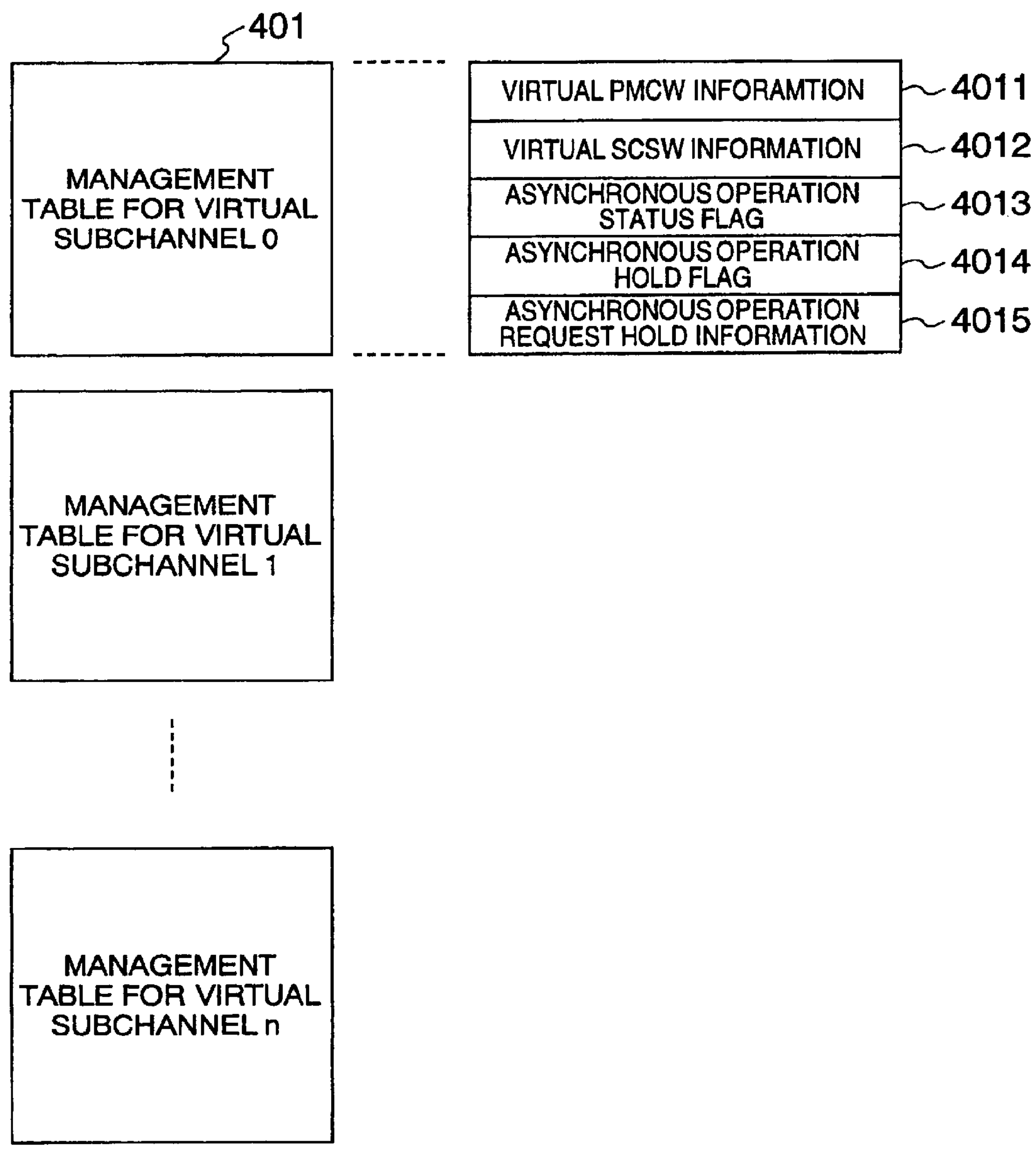
FIG. 3 is a diagram showing a table for managing a virtual subchannel corresponding to a virtual input/output unit according to an embodiment of the invention.

An embodiment of the present invention will be described below with reference to FIGS. 1 to 11. In this specification, virtual resources involved are assumed to include an instruction processor, a main memory, an extended memory unit and an input/output unit. Also, the asynchronous operation involved is assumed to be the input/output operation of an extended channel system (ECS).

FIG. 1 is a block diagram for explaining virtual machine systems according to an embodiment of the invention. Prior to starting to the operation of virtual machine systems 20, 22, the configuration definitions 242, 252 of the real machine resources used for the virtual machine and logic names 241, 251 corresponding to the respective real machine resources are designated in the generation information 24, 25 by a system parameter generator of the virtual machine systems. In the process, an identical logic name is designated for the virtual machine systems 20, 22 for the unit shared by the real machines. The logic names 241, 251 permit the recognition of the real resources shared by the virtual machine systems 20, 22. The logic names 241, 251 and the real machine configuration definition information 242, 252 in the generation information 24, 25 are stored in a storage medium (system volume) which stores the virtual machine systems 20, 22, and are read into and managed by the logic name information 2012, 2212 of real resource management tables 201, 221 in each VMCP at the time of starting the operation of the virtual machine systems 20, 22.

In the process of generating (logging-on) the VMs 203, 206 and 226, the VM configuration information 2021, 2221 are generated in virtual resource management tables 202, 222, and in accordance with the VM directory information defined in advance for the VMs, the virtual resources are occupied or shared and assigned to the VMs 203, 206, 226. The assignment to the VMs is managed by the VM assignment information 2022, 2222 in the virtual resource management tables 202, 222 and the assignment information 2011, 2211 in the real resource management tables 201, 221.

As described above, the ECS in the actual machine system is assigned in the ascending order of the subchannel number from 0, and the input/output unit (device) is handled in a subchannel in one-to-one correspondence. As a result, the real subchannel is virtualized also in the virtual machine system, and the subchannel numbers are assigned sequentially from 0 each time of assignment of the input/output unit. The assignment information of the virtual input/output unit is configured as shown in the virtual subchannel management table 40 of FIG. 3, and is stored in the virtual resource management tables 202, 222. Each virtual subchannel information thus is managed by the VMCP.

In FIG. 3, at the time of assigning a virtual input/output unit to the VM, corresponding real subchannel information is stored in the input/output path information (PIM, PAM, CHPIDO to CHPID7) of the virtual PMCW information 4011 corresponding to the path management control word (PMCW) of FIG. 2. In the STSCH instruction simulation, the contents stored in the virtual PMCW 4011 are stored in the main memory of the VM. The asynchronous operation management tables 207, 227 in FIG. 1, for convenience' sake, indicate only an asynchronous operation status flag 4012 and an asynchronous operation hold flag 4014 extracted from the virtual subchannel table 40 in the virtual resource management tables 202, 222.

FIG. 4 is a general flowchart showing the VM movement control according to an embodiment of the invention. Explanation will be given below of the case in which the operating system (OS) 204 on the VM 203 of the virtual machine system 20 shown in FIG. 1 is moved as an operating system 224 onto the VM 223 of another virtual machine system 22.

Notification of Configuration of VM to be Moved

Figure 5:
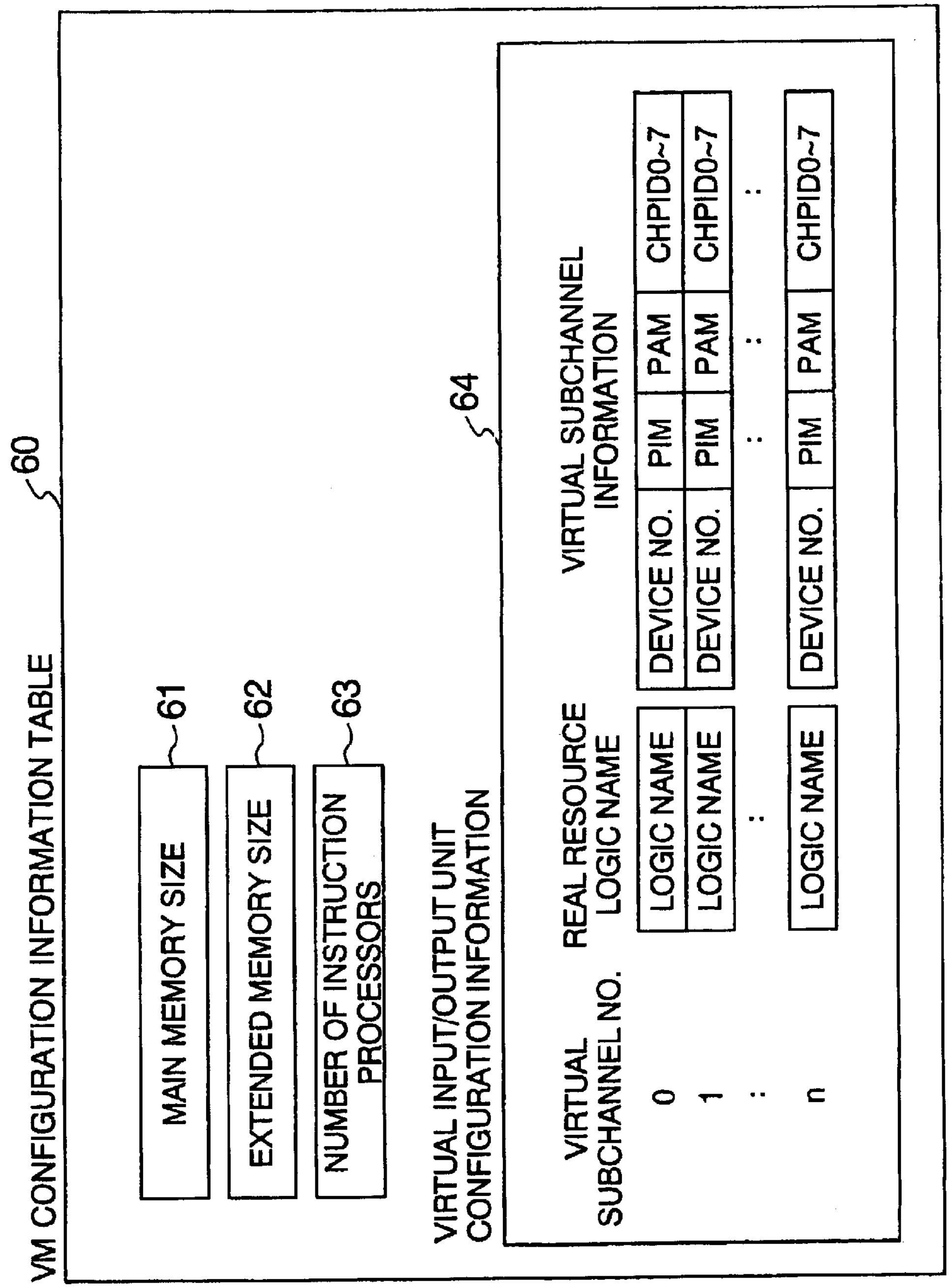
FIG. 5 is a diagram showing an information table transferred between real machines for generating a VM of the same configuration according to an embodiment of the invention.

Either a VM movement command is issued from a system console for controlling the virtual machine system, or a VM movement request is notified to a VM movement receiving means 210 by a handshake instruction for VM movement given from the operating system working on the VM and delivered to a VM configuration information notification means 211. Upon receipt of the VM movement request notification, the VM configuration notification means 211 reads the VM configuration information 2021, the information 2022 on assignment of the virtual resources to the VM and the logic name 2012 of the real resources corresponding to the virtual resources assigned to the VM 204, and prepares and stores a VM configuration information table 60 as shown in FIG. 5. In the process, for the purpose of unifying the subchannel number at the origin VM and the destination VM, the virtual machine system stores the information of the input/output unit assigned to the origin VM in the order of the virtual subchannel number in the virtual input/output unit configuration information 64 of the VM configuration information table 60 with reference to the virtual subchannel management table 40 of FIG. 3.

The VM configuration notification means 211 transmits the VM configuration information table 60 to the virtual machine system 22 through information trasmission means 12 for transmitting information between the real machines and thus requests the generation of a VM configuration (step 501).

Generation of Identical VM Configuration

An identical configuration generation possibility judging means 231 of the virtual machine system 22, upon receipt of the VM configuration information table 60 from the virtual machine system 20 through the inter-real machine information transmission means 12 (step 511), judges whether an identical VM configuration can be generated or not from the information in the VM configuration information table 60 and the real resource management table 221 (step 512). FIG. 6 is a detailed flowchart showing the judgment of the possibility of generating an identical VM configuration. The possibility of assigning the same main memory size as in the origin VM, the possibility of assigning an extended memory size of the origin VM and the possibility of assigning the number of virtual processors of the origin VM are judged in steps 701, 702 and 703 in that order. After judgment at these steps, step 704 checks whether the virtual input/output unit assigned to the origin VM is configured in the real machine of the virtual machine system 22 at the destination. Step 705 checks whether the virtual particular input/output unit is configured in the real machine at the destination but assigned exclusively to another VM. Whether all the virtual input/output units are checked is judged (step 706). Otherwise, the next virtual input/output is checked (step 707). Thus, steps 708, 709 judge whether an identical VM configuration can be generated or not.

It should be noted that only the assignability of an identical input/output unit is judged, and the difference between the origin VM and the destination VM is absorbed by the VMCP virtualizing the input/output route.

Upon judgment that an identical VM configuration can be generated, the identical VM configuration generation means 232 adds the VM configuration information of the VM 223 generated to a virtual resource management table 222. Specifically, in accordance with the information of the origin VM 203 stored in the VM configuration information table 60 received in step 511, corresponding destination machine resources (main memory, extended memory, instruction processor and input/output unit) are assigned thereby to update the VM assignment information 222 in the virtual resource management table 60 and the assignment information 2211 in the real resource management table 221, thus generating a VM 223 identical to the origin VM 203 (step 513).

The virtual subchannel number for the virtual input/output unit is assigned in the ascending order from 0 each time of VM assignment of the input/output unit. In accordance with the order specified in the virtual input/output unit configuration information 64 in which the input/output unit configurations of the origin VM 203 are stored in the order of subchannel number, the input/output units are assigned to the destination VM 223, thereby generating an identical input/output configuration including the channel number. Also, in the virtual resource management table 222, the virtual subchannel management table 40 shown in FIG. 3 is generated each time of assignment of a virtual input/output unit, and the value stored in the virtual input/output unit information 64 is stored as the virtual PMCW information (device number, PIM, PAM, CHPID0 to CHPID7) in the particular table. As a result, the input/output path configurations (the information in the PMCW stored in response to the STSCH instruction) visible from the operating system have the same configuration.

The virtual input/output path information at the origin VM, which uses the value of the real subchannel information, coincides with the real input/output route information. The virtual input/output path configuration at the destination VM, however, is not necessarily coincident with the real input/output path configuration. The problem posed by the non-coincidence is the selection of the input/output path for the start subchannel (SSCH). As a selection path mask (SPM), the SSCH instruction uses the logical product of the path mask and the path installed mask (PIM) designated as the logic path mask (LPM) of the ORB (FIG. 2) and the path available mask (PAM), and starts the input/output operation by selecting one of the input/output paths corresponding to the result (SPM) of bit "1". Specifically, in the absence of a real input/output path corresponding to the SPM for starting the input/output by the operating system at the destination VM, the input/output which has been normally completed at the origin VM constitutes an input/output error at the destination VM (input/output start failure: condition code 3 for the result of the SSCH instruction or delay condition code 3 for the input/output interrupt).

Figure 9:
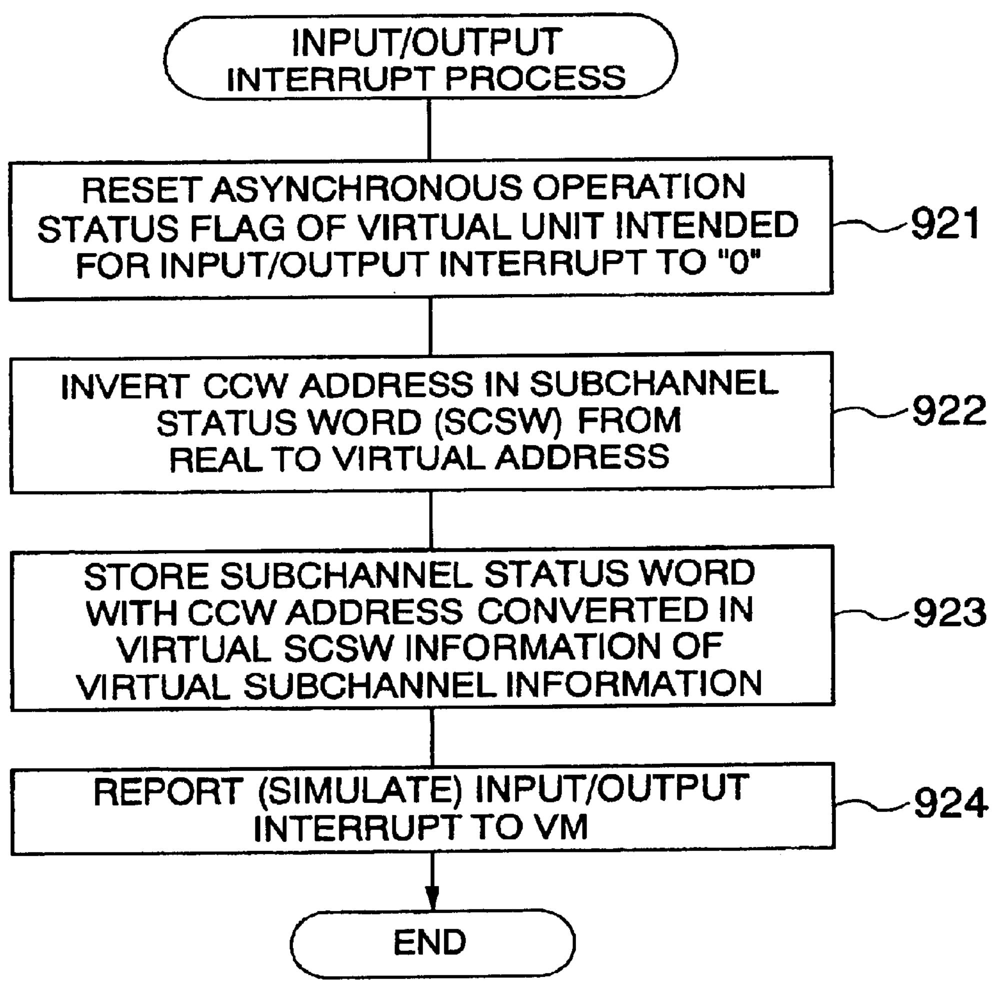
FIG. 9 is a flowchart showing the logic of an input/output interrupt simulation according to an embodiment of the invention.

This difference in the real input/output path between origin and destination is obviated by executing the SSCH instruction simulation by an asynchronous operation request simulation means 216 as shown in FIG. 8. In FIG. 8, the SPM generated from the LPM designated by the operating system in the virtual input/output path configuration is called a virtual SPM, which is determined as the logical product of the LPM designated by the operating system, the virtual PIM and the virtual PAM (step 901). In the case where the value of the virtual SPM is "0", an input/output start failure is simulated (steps 902, 915). In the case where the value of the virtual SPM is "1", unless the VM issuing an instruction is in preparation for VM movement, the SPM in the real input/output path configuration is called the real SPM which is determined from the logic product of the virtual SPM, the real PIM and the real PAM (steps 903, 907). In the case where the real SPM assumes a value other than "0", it indicates the existence of a real input/output path corresponding to the input/output path designated by the OS. Therefore, the value of the real SPM is set in the real LPM and an SSCH instruction is issued to the real machine (steps 908, 909, 911, 912). In the case where the real SPM assumes a value of "0", on the other hand, it indicates the absence of a real input/output path corresponding to the input/output path designated by the operating system. Therefore, the logic product of the real PIM and the real PAM is set in the real LPM (step 910), and an SSCH instruction is issued to the real machine, thereby avoiding an input/output error (input/output start failure) (steps 911, 912). Once the SSCH instruction is issued, the asynchronous operation status flag of the virtual subchannel management table 40 (FIG. 3) involved is set to 1, and a successful input/output start is simulated (steps 913, 914). The input/output completion interrupt process executed at the time of successful input/output start is shown in FIG. 9. Upon starting the input/output interrupt process, the asynchronous operation status flag of the VM intended for input/output interrupt is reset to "0" (step 921). Then, the CCW address in the subchannel status word (SCSW) is inverted from the real address to the virtual address (step 922). The subchannel status word with a converted CCW address is stored in the virtual SCSW information of the virtual subchannel information (step 923). Finally, the input/output interrupt is reported (simulated) to the VM (step 924).

According to this embodiment, the above-mentioned SSCH instruction simulation makes it possible to generate a VM configuration with an identical subchannel number and an identical input/output route information between the origin VM and the destination VM, and thus to normally execute the input/output operation request issued by the operating system at the destination.

Response on Generation of Identical VM Configuration

After generating an identical VM configuration, the virtual machine system 22 gives a response notifying the successful VM generation to the virtual machine system 20 from which the movement is requested, through the information transmission means 12 between the real machines, and waits for the arrival of the virtual resource information from the origin VM 203 (step 514). In the case where the judgment is that a VM of an identical configuration cannot be generated, in contrast, the virtual machine system 22 gives a response notifying the VM preparation failure to the virtual machine system 20 which has requested the movement, and suspends or terminates the execution of the VM move control (step 519). Upon receipt of the response notifying the VM generation failure from the destination, the origin judges that the generation of an identical VM configuration has failed and suspends or terminates the execution of the VM move control (steps 502, 503).

In this way, the identity of the VM configuration between machines (VMs 203 and 223 in this embodiment) can be guaranteed without generating different VM configurations.

Suspension of Asynchronous Operation

The input/output operation is performed asynchronously with the instruction processor. During the input/output operation, the main memory is liable to be updated. In the case where the main memory of the VM is moved to the VM of another real machine before completion of the on-going input/output operation, therefore, the contents of the main memory of the origin VM may be different from those of the destination VM. In other words, the VM cannot be moved before complete asynchronous input/output operation.

Figure 7:
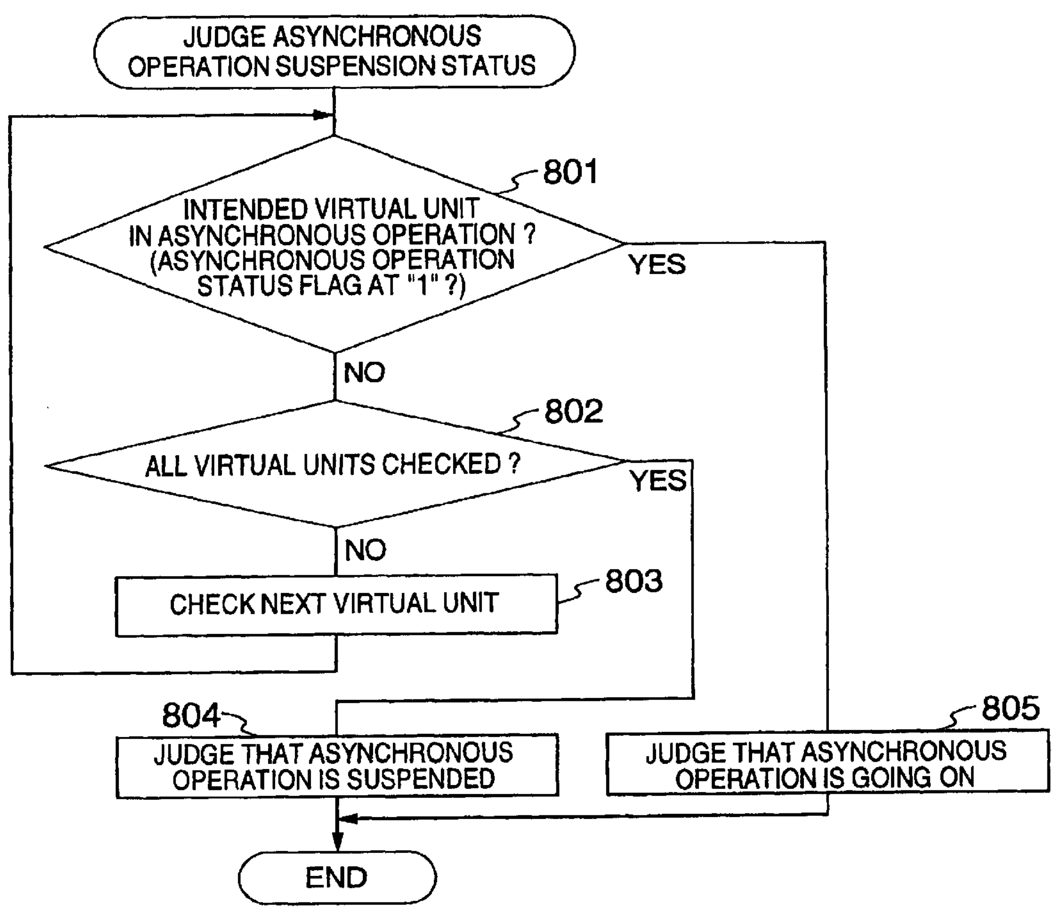
FIG. 7 is a flowchart showing the logic for judging the stoppage of all the asynchronous operations related to the VM to be moved according to an embodiment of the invention.

In view of this, the virtual machine system 20 at the origin receives the response to the VM generation request from the virtual machine system 22 at the destination (step 502), and upon confirmation that an identical VM configuration has been successfully generated (step 503), holds the request of a new asynchronous operation instruction 205 issued by the OS 204 in the asynchronous operation request simulation means 216 (step 504), while at the same time causing the VM suspension possibility judging means 215 to confirm that the input/output operation constituting the asynchronous operation is complete (step 505). FIG. 7 shows a flowchart of the process for judging the suspension of the asynchronous operation at the VM suspension possibility judging means 215. Also, steps 904 to 906 in the SSCH instruction simulation of FIG. 8 show the process of holding a new asynchronous operation instruction request in the asynchronous operation request simulation means 216.

An asynchronous operation management table 207 managed in the VMCP of the virtual machine system 20 has asynchronous operation status information 2271 and asynchronous operation request hold information 2272 corresponding to the virtual input/output unit, which are managed as an asynchronous operation status flag 4013, an asynchronous operation hold flag 4014 and an asynchronous operation request hold information 4015 in the virtual subchannel management table 40 corresponding to the virtual input/output unit shown in FIG. 3. In the simulation of the start subchannel (SSCH) instruction corresponding to the intended virtual subchannel shown in FIG. 8, a start subchannel is issued to the real machine and the asynchronous operation status flag is set to "1" (step 913) in the case where the input/output operation is successfully started. As shown in FIG. 9, on the other hand, the asynchronous operation status flag is reset to "0" (step 921) in the case where the input/output operation on the real machine of an intended virtual unit is completed, followed by input/output simulation in the VM (steps 922, 923, 924). The VM suspension possibility judging means 215, as shown in FIG. 7, judges the asynchronous operation status with reference to the value of the asynchronous operation status flag to determine whether the input/output operation constituting the asynchronous operation is suspended. Specifically, in the case where the value of the asynchronous operation status flag corresponding to all the virtual units of the VM 203 is "0", the VM suspension possibility judging means 215 judges that the asynchronous operation is suspended (steps 801, 802, 803, 804). In the case where the input/output operation is performed by at least a virtual unit of the VM 203, on the other hand, the value of the asynchronous operation status flag on at least one of the virtual units is "1", so that the judgement is possible that the asynchronous operation is going on (steps 801, 805).

Now, assume that only the VM suspension possibility judging means 215 is used to wait for the suspension of the asynchronous operation. The input/output operation constituting the asynchronous operation can be performed in parallel by a plurality of input/output units. Normally, the operating system starts the input/output operation of a plurality of input/output units and therefore the probability is very low that none of the input/output units is performing the input/output operation. For this reason, the asynchronous operation request simulation means 216 holds the request of the new asynchronous operation instruction 205 issued by the OS 204, and thus holds the particular request in the asynchronous operation management table 207, thereby creating a status in which the asynchronous operation is not under way (step 504). Specifically, in the case where the preparation is going on for VM movement at the time of the instruction simulation in the VMCP, the operation request block (ORB) 30 constituting the operand of the start subchannel shown in FIG. 2 making up the asynchronous operation instruction 205 issued by the OS is stored in the asynchronous operation request hold information 4015, and the flag indicating that the asynchronous operation request is being held, i.e. the asynchronous operation hold flag is set to "1". Then, the flag indicating the start hold in the virtual SCSW information 4012 in the virtual subchannel management table 40 shown in FIG. 3 is set to "1". Thus, the input/output operation request is held in the ECS, and the start hold status in which the input/output operation is yet to be started is simulated.

The asynchronous operation request simulation means 216 simulates a successful input/output start and completes the process without issuing the start subchannel to the real machine (steps 903, 904, 905, 906, 914). The asynchronous operation hold flag 4014 and the asynchronous operation request hold information 4015 are used for restarting the input/output operation by the virtual machine system 22 on another real machine after VM movement.

In the case where the asynchronous operation is held or suspended by the asynchronous operation request simulation 216 and the VM suspension possibility judging means 215 judges that the VM can be suspended, then the VM 203 is suspended by the VM suspension means 214 so that the virtual resource information may not be updated (step 506). In other words, the VM suspension means 214 suspends the assignment of the real processor resource to the virtual processor of the origin VM 203. As a result, the identity of the virtual resource information is guaranteed between the destination and the origin.

VM Movement and Operation Restart

Figure 11:
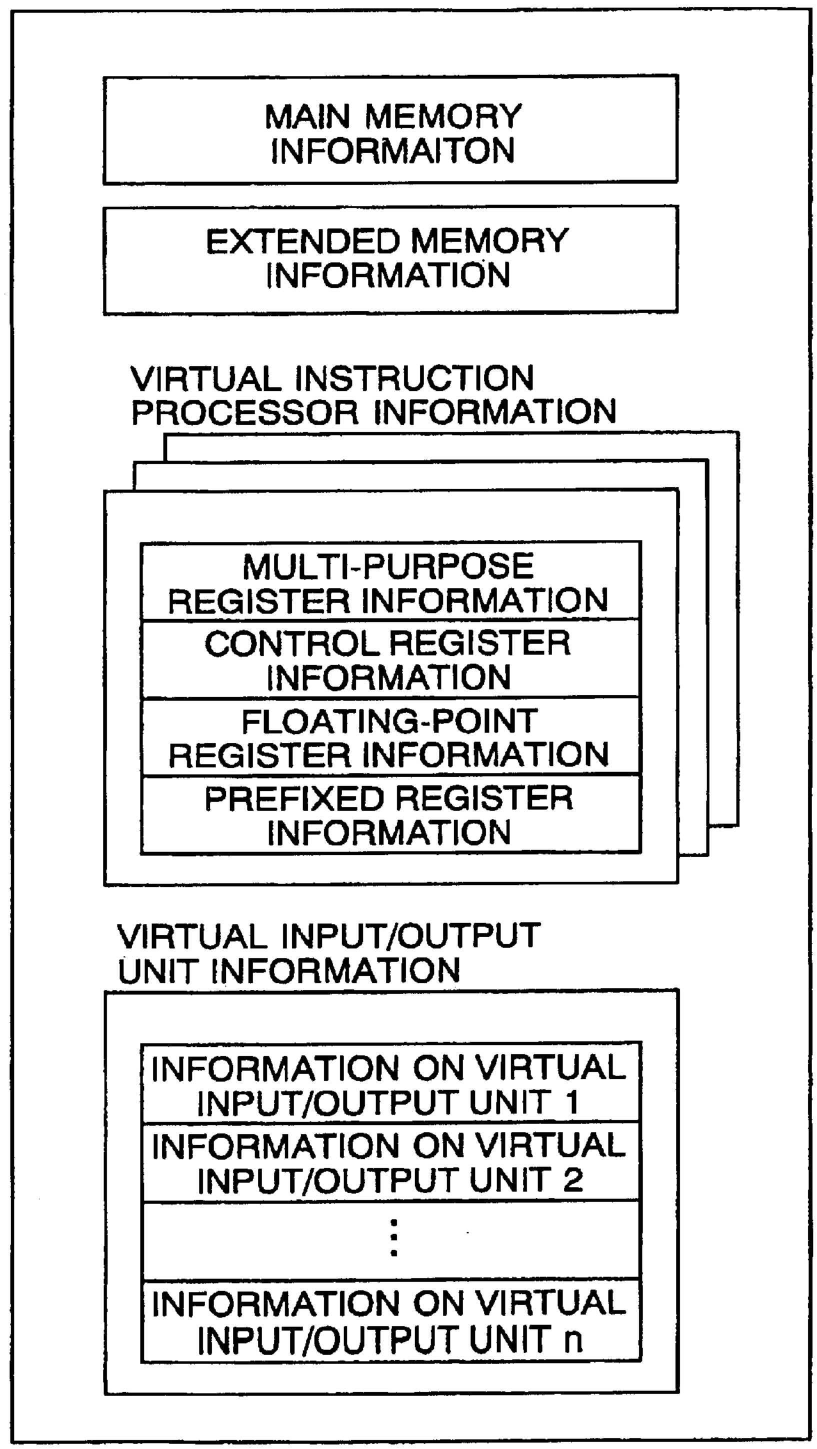
FIG. 11 is a diagram showing the VM resource information moved between virtual machine systems according to an embodiment of the invention.
Figure 12:
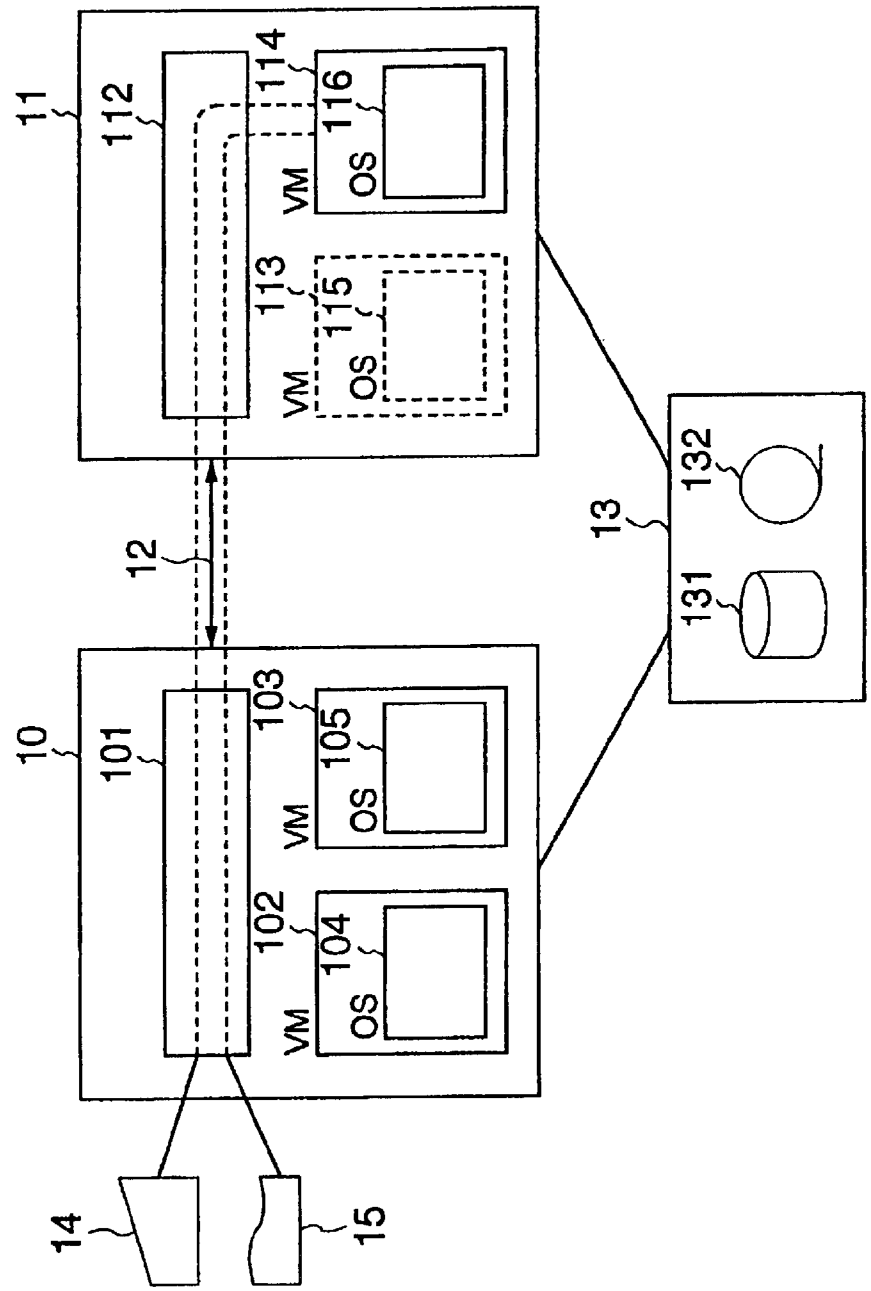
FIG. 12 is a general block diagram of a virtual machine system configured of loosely-coupled multiprocessors.

The virtual machine system 20 at the origin, after the VM is suspended by the VM suspension means 214, reads the virtual resource information (the main memory, the extended memory, the instruction processor, the input/output unit and the subchannel) as shown in FIG. 11 by the virtual resource information read transmission means 213, and transmits it to the virtual machine system 22 at the destination VM through the inter-real machine information means 12 (step 507). The virtual machine system 22 at the destination VM causes the virtual resource information receipt and storage means 233 to store the received virtual resource information in each corresponding virtual resource that has been assigned by the identical VM configuration generation means 232 (step 515).

Immediately after that, the asynchronous operation management information transmission means 217 of the virtual machine system 20 at the origin transmits the asynchronous operation management table 207 storing and holding the asynchronous operation request to the virtual machine system 22 at the VM destination through the inter-real machine information transmission means 12 as the asynchronous operation management information (step 508). The asynchronous operation management information receiving means 237 of the virtual machine system 22 at the VM destination stores the received asynchronous operation management information in the asynchronous operation management table 227 (step 516).

The above-mentioned process completes the information transmission between the virtual machine systems. After that, the virtual machine system 20 performs the post-processing for the origin VM and the virtual machine system 22 restarts the operation of the destination VM 223 in the following-described manner.

In the virtual machine system 20 at the origin where the transfer of the VM information is complete, the VM 203 is extinguished by the VM configuration extinction means 212 (step 509). Specifically, the real resource management information (2011) corresponding to the virtual resource assigned to the VM 203 is updated to an unassigned status, thus releasing the virtual resources (the main memory, the extended memory, the instruction processor and the input/output unit). As a result of extinction of the VM (103), the load on the virtual machine system 20 is reduced.

Figure 10:
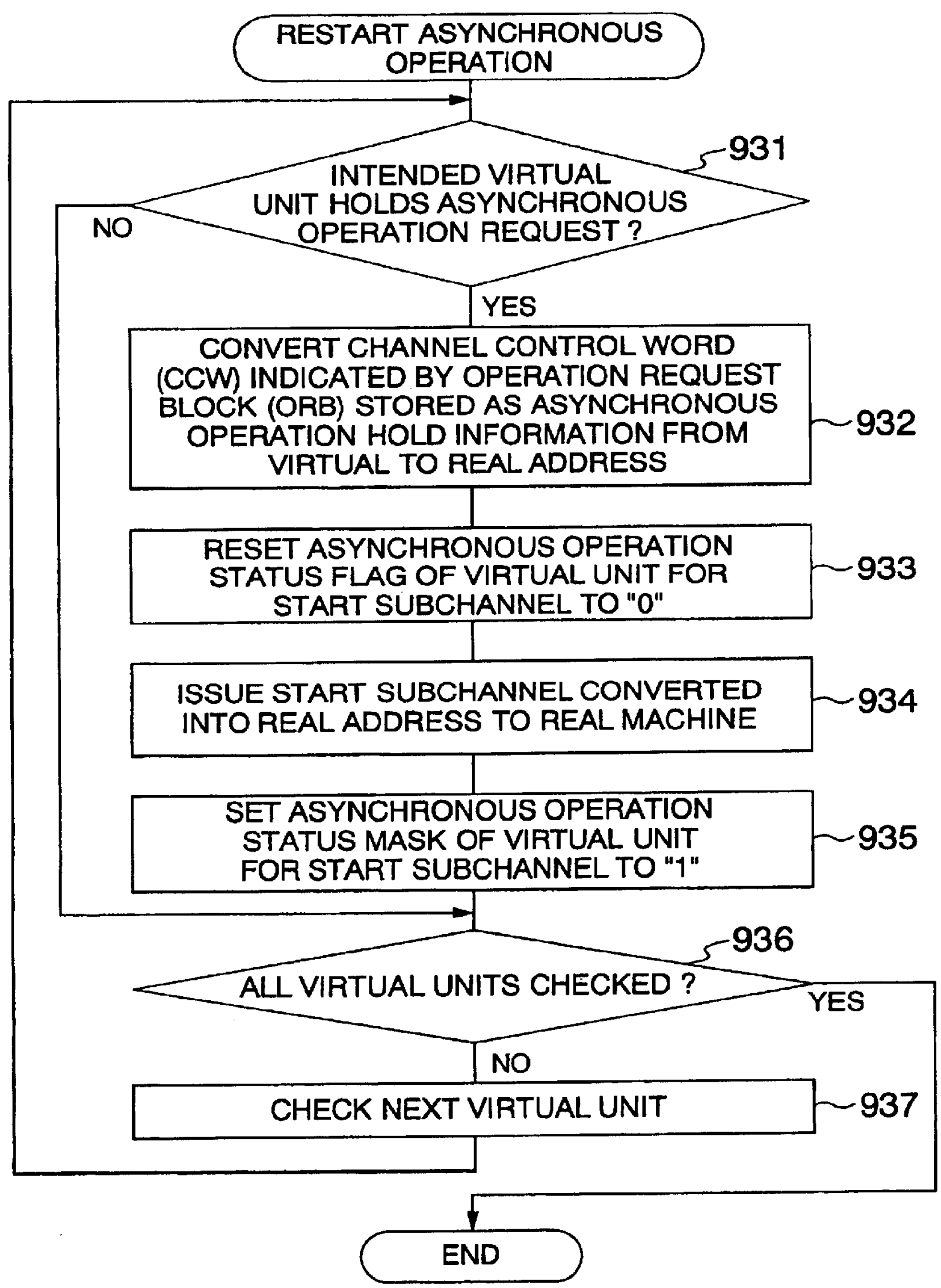
FIG. 10 is a flowchart showing the logic of restarting the asynchronous operation held according to an embodiment of the invention.

The destination VM 223 at which the transfer of the VM information is completed, on the other hand, starts the operation requesting an asynchronous operation and the operation of the virtual instruction processor that have thus far been held and thus continues the OS operation (steps 517, 518). The restart process flow for the asynchronous operation is shown in FIG. 10.

The asynchronous operation request start means 236 restarts the asynchronous operation request in the asynchronous operation management table 227 transferred from the origin. As shown in FIG. 3, the status of holding the asynchronous operation request is managed by the asynchronous operation hold flag 4014. For all the virtual input/output units for which the asynchronous operation hold flag is set to "1", the channel control word (CCW) indicated by the CCW address in the ORB of the start subchannel (SSCH) issued by the OS and stored in the asynchronous operation hold information 2272 is transferred from the virtual address to the real address, and a start subchannel is issued to the real machine (steps 931, 932, 933, 934, 935, 936, 937). At the destination VM, the CCW virtual address is converted to the real address, thereby making it possible to move the VM even in the case where different positions on the main memory (real address) are assigned to the origin VM and the destination VM. As a result, the input/output operation constituting the asynchronous operation held in the origin VM (103) can be executed in the destination virtual machine system with the movement of the VM. Then, the VM restart means 234 restarts the VM operation suspended by the VM suspension means 214, by assigning the real processor resources to the virtual processor of the destination VM (103).

The above-mentioned control operation permits the OS to be moved onto the VM of another real machine and thereby to continue the OS operation in response to a VM movement instruction without performing such operations as the suspension of asynchronous operation on the OS or the suspension of the OS operation.

According to this invention, there is provided a loosely-coupled multiprocessor system operated by a virtual machine system constructed on each of a plurality of real machines, wherein the operating system (virtual machine) operating on a given virtual machine system can be moved to a virtual machine on a virtual machine system of another real machine. An effective utilization of the machine resources thus can be realized. Also, the versatility of system operation is improved by moving the virtual machine between real machines in preparation for a planned suspension of the real machine operation for assuring hardware maintenance of the real machine.

What is claimed is:

1. A method for moving an operating system from a first real machine to a second real machine, comprising the steps of:

transmitting virtual machine configuration information indicating corresponding relation between device identifiers of I/O devices and logic names of said I/O devices used by an operating system working in a first virtual machine running on said first real machine from a first virtual machine control program running on said first real machine to a second virtual machine control program running on said second real machine in response to an operating system movement instruction between said first and second virtual machine control programs under control of said first virtual machine control program;

generating a second virtual machine on said second real machine based on said virtual machine configuration information under control of said second virtual machine control program;

suspending operation of said operating system on said first virtual machine in response to a request from said second virtual machine control program;

sending register information necessary for resuming said operating system from said first virtual machine control program to said second virtual machine control program under control of said first virtual machine control program;

resuming, from said suspending step, operation of said operating system using said register information on said second virtual machine under control of said second virtual machine control program; and wherein said second virtual machine control program receives said virtual machine configuration information from said first virtual machine control program to determine whether said second virtual machine can be generated on said second real machine.

2. A method according to claim 1, wherein said first virtual machine control program suspends operation of said operating system before sending said register information from said first virtual machine control program to said second virtual machine control program.

3. A method according to claim 1, wherein:

said second virtual machine control program provides said first virtual machine control program with successful generation of said second virtual machine in accordance with said virtual machine configuration information on said second real machine;

said first virtual machine control program holds a request for input/output operation until current input/output operation completes to thereafter send said request for said input/output operation to said second virtual machine control program; and said second virtual machine control program resumes input/output operation based on said request for said input/output operation sent from said first virtual machine control program.

4. A program to be executed on a system to move an operating system from a first real machine to a second real machine, comprising the steps of:

transmitting virtual machine configuration information indicating corresponding relation between device identifiers of I/O devices and logic names of said I/O devices used by an operating system working in a first virtual machine running on said first real machine from a first virtual machine control program running on said first real machine to a second virtual machine control program running on said second real machine in response to an operating system movement instruction between said first and second virtual machine control programs under control of said first virtual machine control program;

generating a second virtual machine on said second real machine based on said virtual machine configuration information under control of said second virtual machine control program;

suspending operation of said operating system on said first virtual machine in response to request from said second virtual machine control program;

sending register information necessary for resuming said operating system from said first virtual machine control program to said second virtual machine control program under control of said first virtual machine control program;

resuming, from said suspending step, operation of said operating system using said register information on said second virtual machine under control of said second virtual machine control program; and wherein said second virtual machine control program receives said virtual machine configuration information from said first virtual machine control program to determine whether said second virtual machine can be generated on said second real machine.

5. A program according to claim 4, wherein said first virtual machine control program suspends operation of said operating system before sending said register information from said first virtual machine control program to said second virtual machine control program.

6. A program according to claim 4, wherein:

said second virtual machine control program provides said first virtual machine control program with successful generation of said virtual machine in accordance with said virtual machine configuration information on said second real machine;

said first virtual machine control program holds a request for input/output operation until current input/output operation completes to thereafter send said request for said input/output operation to said second virtual machine control program; and said second virtual machine control program restarts input/output operation based on said request for said input/output operation sent from said first virtual machine control program.

7. A storage medium for storing codes for moving an operating system from a first real machine to a second real machine in an apparatus, said storage medium comprising:

codes for transmitting virtual machine configuration information indicating corresponding relation between device identifiers of I/O devices and logic names of said I/O devices used by an operating system working in a first virtual machine running on said first real machine from a first virtual machine control program running on said first real machine to a second virtual machine control program running on said second real machine in response to an operating system movement instruction between said first and second virtual machine control programs under control of said first virtual machine control program;

codes for generating a second virtual machine on said second real machine based on said virtual machine configuration information under control of said second virtual machine control program;

codes for suspending operation of said operating system on said first virtual machine in response to a request from said second virtual machine control program;

codes for sending register information necessary for resuming said operating system from said first virtual machine control program to said second virtual machine control program under control of said first virtual machine control program;

codes for resuming, from said suspending step, operation of said operating system using said register information on said second virtual machine under control of said second virtual machine control program; and wherein said second virtual machine control program receives said virtual machine configuration information from said first virtual machine control program to determine whether said second virtual machine can be generated on said second real machine.

8. A storage medium according to claim 7, wherein said first virtual machine control program suspends operation of said operating system before sending said register information from said first virtual machine control program to said second virtual machine control program.

* * * * *

UNITED STATES PATENT AND TRADEMARK OFFICE

CERTIFICATE OF CORRECTION

PATENT NO. : 6,802,062 B1
DATED : October 5, 2004
INVENTOR(S) : Oyamada et al.

It is certified that error appears in the above-identified patent and that said Letters Patent is hereby corrected as shown below:

Title page,
Insert Item -- [30] Foreign Application Priority Data
April 1, 1997 (JP) ................................ 09-082613 --

Signed and Sealed this

Ninth Day of August, 2005

JON W. DUDAS
*Director of the United States Patent and Trademark Office*